United States Patent
Matsubara et al.

(10) Patent No.: US 10,951,041 B2
(45) Date of Patent: Mar. 16, 2021

(54) MOTOR SYSTEM

(71) Applicants: Toyota Jidosha Kabushiki Kaisha, Toyota (JP); Denso Corporation, Kariya (JP)

(72) Inventors: Kiyotaka Matsubara, Ichinomiya (JP); Makoto Nakamura, Okazaki (JP); Daigo Nobe, Toyota (JP); Ryuji Omata, Kariya (JP)

(73) Assignee: Denso Corporation, Kariya (JP)

( * ) Notice: Subject to any disclaimer, the term of this patent is extended or adjusted under 35 U.S.C. 154(b) by 64 days.

(21) Appl. No.: 16/360,552

(22) Filed: Mar. 21, 2019

(65) Prior Publication Data
US 2019/0296568 A1 Sep. 26, 2019

(30) Foreign Application Priority Data
Mar. 22, 2018 (JP) .............................. JP2018-055297

(51) Int. Cl.
*H02J 7/00* (2006.01)
*H02P 21/00* (2016.01)
*H02P 27/08* (2006.01)

(52) U.S. Cl.
CPC ................ *H02J 7/00* (2013.01); *H02P 21/50* (2016.02); *H02P 27/08* (2013.01)

(58) Field of Classification Search
CPC ...... H02J 7/1423; H02J 50/12; H02J 2310/48; H02J 7/00; H02P 27/08; H02P 21/50
See application file for complete search history.

(56) References Cited

U.S. PATENT DOCUMENTS

| 10,486,683 B2* | 11/2019 | Ito ........................ B60W 20/13 |
| 2005/0231152 A1* | 10/2005 | Welchko ................. H02P 27/08 318/801 |
| 2006/0164028 A1 | 7/2006 | Welchko et al. |
| 2015/0231978 A1* | 8/2015 | Danner .................... H02J 7/00 307/10.1 |
| 2016/0052505 A1* | 2/2016 | Zhou ..................... B60L 50/16 701/22 |

FOREIGN PATENT DOCUMENTS

| JP | 2000-125411 A | 4/2000 |
| JP | 2000-324871 A | 11/2000 |
| JP | 2006-238686 A | 9/2006 |

\* cited by examiner

*Primary Examiner* — Jared Fureman
*Assistant Examiner* — Duc M Pham
(74) *Attorney, Agent, or Firm* — Dinsmore & Shohl LLP (57) ABSTRACT

A motor system provided with one motor, two batteries, and two inverters further includes a charger which is connected to a first battery and supplies external power; and a control unit which controls drive of the first inverter and the second inverter to drive the motor. When the second battery is charged with the external power, the control unit drives the first inverter and the second inverter to allow power from the first inverter to be transmitted to the second battery through the motor and the second inverter while the motor is in a stationary state.

4 Claims, 10 Drawing Sheets

MOTOR SYSTEM

CROSS REFERENCE TO RELATED APPLICATION

This application claims priority to Japanese Patent Application. No. 2018-055297 filed on Mar. 22, 2018, which is incorporated herein by reference in its entirety including the specification, claims, drawings, and abstract.

TECHNICAL FIELD

The present description discloses a motor system including two power supplies and two inverters. In the motor system, one motor is driven by outputs from the two inverters.

BACKGROUND ART

JP 2000-324871 A discloses a motor system including two power supplies and two inverters. In this motor system, one motor is driven by outputs from the two inverters. In this system, each phase of the star-connected motor includes two windings connected in series. One inverter is connected to a winding end of each phase, and the other inverter is connected to an intermediate point between the windings. Accordingly, it is possible to drive the motor by an output from one inverter, using the two windings (a first drive winding) connected in series and to drive the motor by an output from the other inverter, using the winding disposed in the inner side of the intermediate point (a second drive winding).

Furthermore, JP 2000-125411 A discloses a system including two power supplies' that is, a battery and a fuel cell, and two inverters which are respectively connected to the power supplies. Herein, outputs of the two inverters are respectively connected to both ends of a three-phase coil of one motor. In this system, the two inverters are controlled independently while the battery and the fuel cell are made to have an equal midpoint voltage so as to meet a requirement of output from a motor, changing output from the battery and without changing output from the fuel cell.

CITATION LIST

Patent Literature

[Patent Document 1] JP 2000-324871 A
[Patent Document 2] JP 2000-125411 A

It is desirable that a secondary battery (power supply) mounted on the aforementioned motor system is charged with external power as necessary. However, JP 2000-324871 A and JP 2000-125411 A do not consider charging of such a secondary battery (power supply) with external power.

For external charging, a charger may be connected to each of two power supplies. However, this case requires two chargers and two charging inlets for inserting a charging plug of a commercial power supply, which causes cost increase. Furthermore, in order to charge the two batteries, this case requires time and effort to reinsert the charging plug to the other charging inlet in the middle of operation. Accordingly, charging may fail to be completed during the night, which is not convenient for users.

Therefore, the present description discloses a motor system which enables charging of a power supply with ease and at low cost.

SUMMARY

A motor system disclosed in the present description includes: a motor; a first power supply; a second power supply; a first inverter which converts direct current power of the first power supply into alternating current power and outputs the alternating current power to the motor; a second inverter which converts direct current power of the second power supply into alternating current power and outputs the alternating current power to the motor; a charger which is connected to the first power supply and supplies external power; and a control unit which controls drive of the first inverter and the second inverter to drive the motor, wherein, when the second power supply is charged with the external power, the control unit drives the first inverter and the second inverter to allow power from the first inverter to be transmitted to the second power supply through the motor and the second inverter while the motor is in a stationary state.

Such an arrangement makes it possible to charge both the first power supply and the second power supply with one charger and one charging inlet. Accordingly, compared with a system provided with two chargers and two charging inlets, it is possible to enhance convenience at low cost.

When the second power supply is charged, the control unit may calculate voltage vectors of the first inverter and the second inverter to set a q-axis current of the motor to 0.

Such an arrangement sets output torque of the motor to 0 and allows the motor to be in a stationary state.

The motor system may also have the following arrangement; that is, the second inverter includes a plurality of legs which is connected in parallel and is formed by connecting an upper arm and a lower arm in series, wherein each of the legs has both ends being connected to the second power supply and an intermediate point being connected to a coil of the motor, the upper arm and the lower arm both includes a switching element and a rectifying element, the rectifying element being connected in parallel with the switching element and configured to flow a current in a reverse direction, and when the second power supply is charged, the control unit drives the first inverter in powering mode and shuts down the second inverter to allow power from the first inverter to be transmitted to the second power supply through the rectifying element.

Such an arrangement enables charging of the second power supply by simple control.

Furthermore, when the second power supply is charged, the control unit may drive the first inverter in powering mode and may drive the second inverter in regeneration mode to allow power from the first inverter to be transmitted to the second power supply.

With such an arrangement, even though the second power supply has a potential higher than that of the power transmission side (the first power supply or the charger), the second power supply is charged.

According to the motor system of the present description, it is possible to charge both the first power supply and the second power supply with one charger and one charging inlet. Accordingly, compared with a system provided with two chargers and two charging inlets, it is possible to enhance convenience at low cost.

BRIEF DESCRIPTION OF DRAWINGS

Embodiment(s) of the present disclosure will be described by reference to the following figures, wherein.

DESCRIPTION OF EMBODIMENTS

Hereinafter, an arrangement of a motor system will be described with reference to the drawings. It should be noted that the present disclosure is not limited to examples described herein.

"Arrangement of System"

Figure 1:
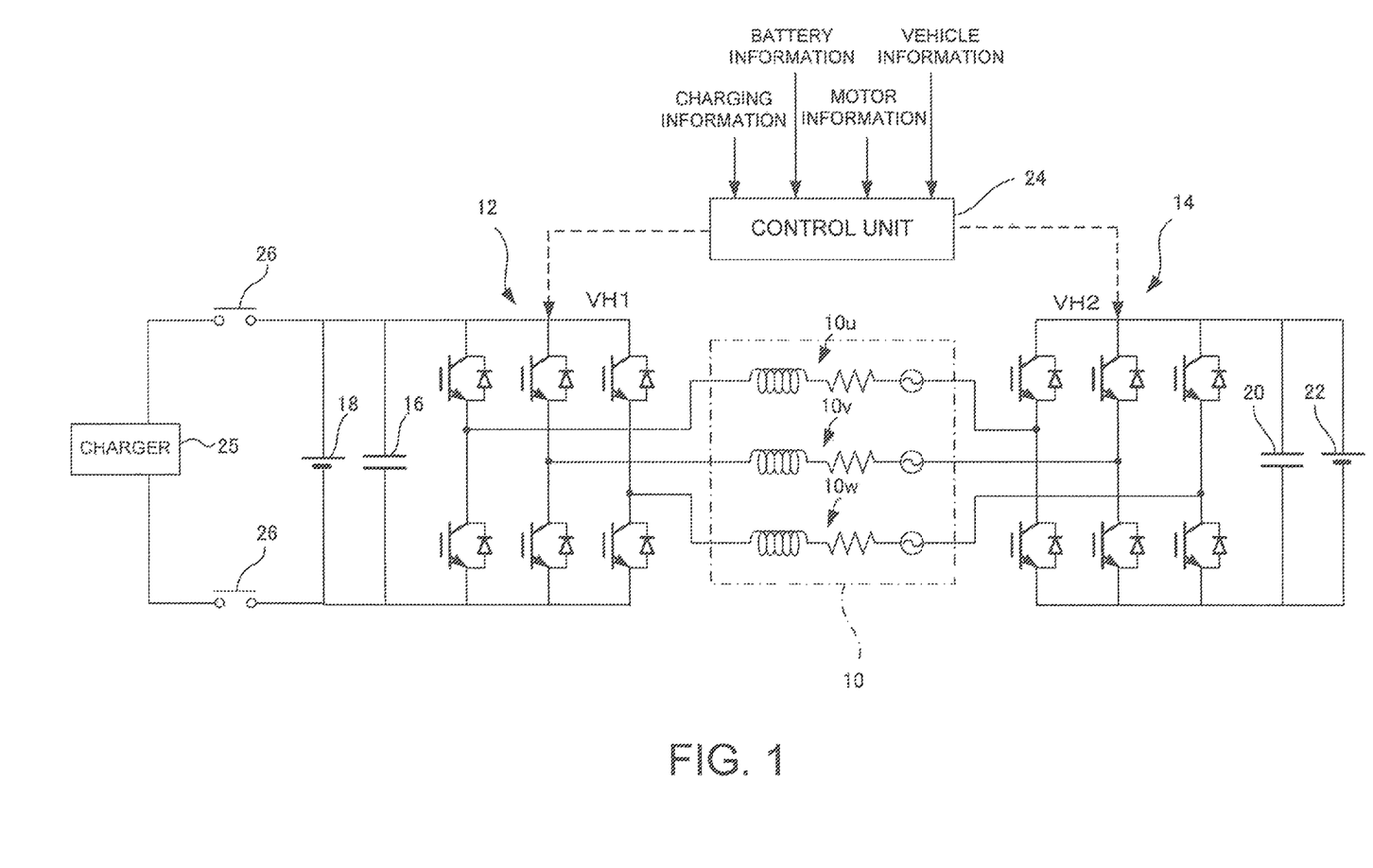
FIG. 1 is a diagram illustrating a general arrangement of a motor system according to an embodiment.

FIG. 1 is a diagram illustrating an arrangement of a motor system. A motor 10 functions not only as an electric motor that generates motive, power but also as a generator that generates power. The motor 10 is a three-phase motor, including three-phase coils 10u, 10v, and 10w. Each of the coils 10u, 10v and 10w includes a reactor component, a resistance component, and an induced electromotive force (back electromotive force) component, and those coils are illustrated in the drawing as being connected in series. The motor system is mounted on a vehicle, and the motor 10 functions as a motor that generates a driving force for running the vehicle or a generator that generates power by motive power from an engine or braking torque.

Each of the three-phase coils 10u, 10v, and 10w has one end connected to a first inverter 12 that converts direct current power to alternating current power, and each of the three-phase coils 10u, 10v, and 10w has the other end connected to a second inverter 14. In addition, to the first inverter 12, a first capacitor 16 and a first battery 18 are connected in parallel, and to the second inverter 14, a second capacitor 20 and a second battery 22 are connected in parallel. In this example, the first battery 18 and the second battery 22 are employed as a first power supply and a second power supply, but electric storage units such as capacitors may also be employed.

The first inverter 12 and the second inverter 14 are similar in arrangement. Each inverter has three legs connected in parallel, and each leg has two arms (upper arm and lower arm) connected in series. An intermediate point of the leg in each phase is connected to an end of the coils 10u, 10v, and 10w in a corresponding phase. Accordingly, at the time of powering, power from the first battery 18 is supplied to the motor 10 through the first inverter 12, and at the time of regeneration (power generation), power from the motor 10 is supplied to the first battery 18 through the first inverter 12. The second inverter 14 and the second battery 22 also exchange power with the motor 10 in a similar manner.

Each arm includes a switching element (for example, a transistor such as an IGBT) and a rectifying element (for example, a backward diode) connected in parallel. The rectifying element flows a current in a direction opposite to that of the switching element. When the switching element of the upper arm is turned on, a current flows toward a coil in a corresponding phase, and when the switching element of the lower arm is turned on, a current is drawn out of a coil in a corresponding phase.

A charger 25 is connected to the first battery 18 through a relay 26. The charger 25 supplies power of an external power supply (for example, a commercial power supply); that is, external power, to the first battery 18 or the first inverter 12. The charger 25 includes, for example, an AC/DC conversion unit. A charging inlet (not illustrated) is provided in the vehicle, and a charging plug which is attached to the tip of a power line extending from the external power supply is detachably attached to the charging inlet. When the charging plug is attached to the charging inlet, the charger 25 is electrically connected to the external power supply. The relay 26 is turned on at the time of external charging and is turned off at other times. Instead of wired charging with the charging plug and the charging inlet, the motor system herein may employ wireless charging, using a resonance coil provided in both the external power supply and the vehicle. In this case, the charger 25 is connected to the resonance coil (power receiving unit) provided in the vehicle. In any case, when charging (external charging) with external power, it is desirable that not only the vehicle but also the motor 10 be stationary.

The control unit 24 creates switching signals for the first inverter 12 and the second inverter 14 based on, for example, battery information, motor information, vehicle information, and charging information so as to control switching of those inverters.

"Arrangement of Control Unit"

Figure 2:
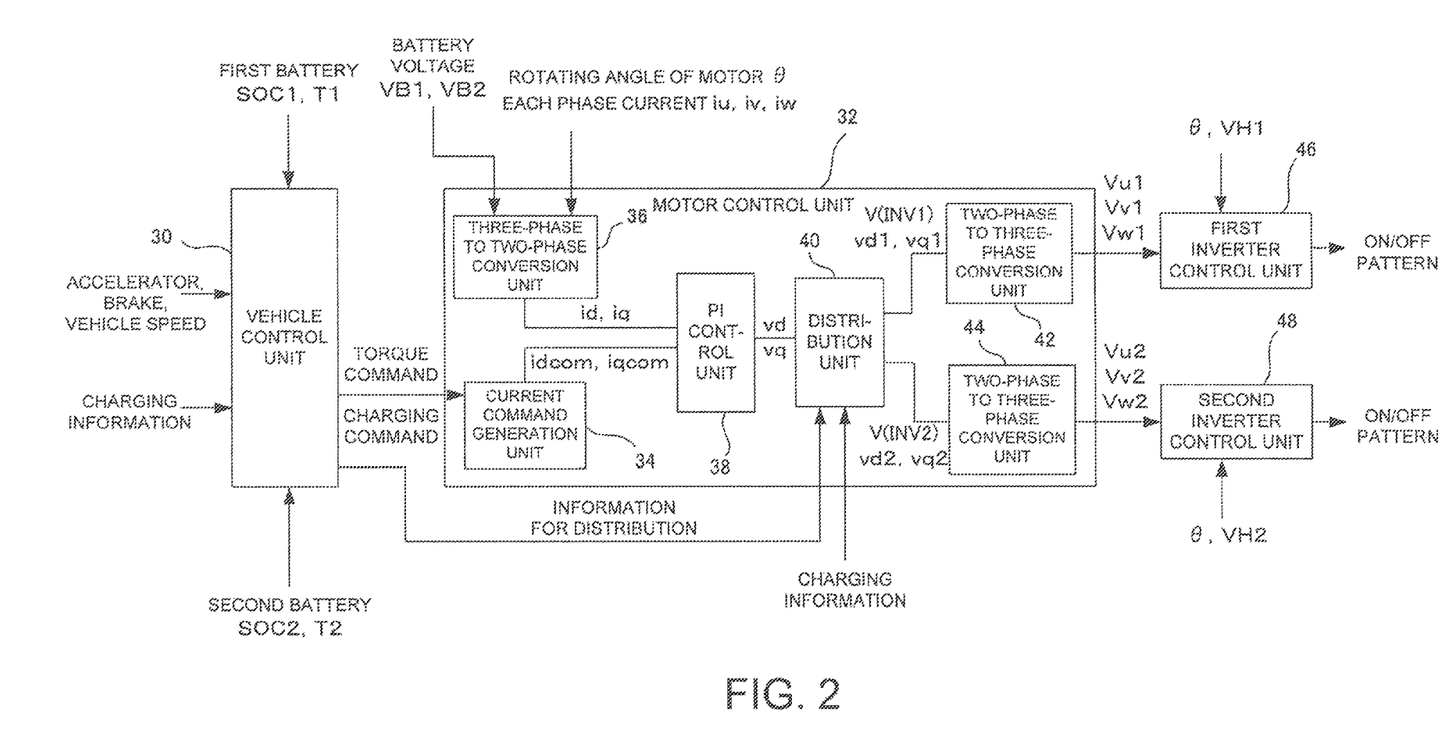
FIG. 2 is a diagram illustrating an arrangement of a control unit.

FIG. 2 illustrates an arrangement of the control unit 24. A vehicle control unit 30 receives vehicle information associated with a running vehicle, for example, control inputs of an accelerator pedal and a brake pedal and vehicle speeds, and receives battery information such as states of charge of the first battery 18 and the second battery 22 (SOC1 and SOC2) and temperatures of the first battery 18 and the second battery 22 (T1 and T2). The vehicle control unit 30 also receives charging information such as instructions for external charging and connection conditions between the charging inlet and the charging plug. Navigation information such as road conditions and destinations may be also be supplied to the vehicle control unit 30.

The vehicle control unit 30 calculates a torque command in regard to an output request (target output torque) for the motor 10 based on, for example, the control inputs of the accelerator pedal and the brake pedal. Determining that external charging is necessary, the vehicle control unit 30 outputs a charging command instead of the torque command.

The calculated torque command or the charging command is supplied to a current command generation unit 34 of a motor control unit 32. Based on the torque command or the charging command, the current command generation unit 34 calculates a d-axis current idcom and a q-axis current iqcom which are target current commands in vector control of the motor 10. An embodiment for calculating current commands during external charging will be described later in detail. A battery voltage VB1 of the first battery 18 and a battery voltage VB2 of the second battery 22, a rotor rotating angle θ of the motor 10, and each of phase currents iu, iv, and iw of the moment are supplied to a three-phase to two-phase conversion unit 36. The three-phase to two-phase conversion unit 36 converts each of the detected phase currents iu, iv, and iw into a d-axis current id and a q-axis current iq. The target current commands (d-axis and q-axis currents) idcom and iqcom from the current command generation unit 34 and the d-axis current id and the q-axis current iq from the three-phase to two-phase conversion unit 36 are supplied to a PI control unit 38, and a motor voltage vector V (d-axis excitation voltage command vd and q-axis torque voltage command vq) is calculated. The PI control unit 38 calculates a voltage command (motor voltage vector V (vd and vq)) by feedback control such as P (proportional) control and I (integral) control. Note that the feedback control may be carried out in combination with feedforward control such as predictive control.

The calculated motor voltage vector V (voltage commands vd and vq) are supplied to a distribution unit 40. The distribution unit 40 distributes the motor voltage vector V (voltage commands vd and vq) to a first inverter voltage vector V (INV1) (voltage commands vd1 and vq1) for the first inverter 12 and to a second inverter voltage vector V (INV2) (voltage commands vd2 and vq2) for the second inverter 14. The distribution performed by the distribution unit 40 will be described later.

The voltage commands vd1 and vq1 from the distribution unit 40 are supplied to a two-phase to three-phase conversion unit 42 in which those commands are converted into three-phase voltage commands Vu1, Vv1, and Vw1 for the first inverter 12 and from which those commands are output. The voltage commands vd2 and vq2 are supplied to a two-phase to three-phase conversion unit 44 in which those commands are converted into three-phase voltage commands Vu2, Vv2, and Vw2 for the second inverter 14 and from which those commands are output. Note that the current command generation unit 34, the three-phase to two-phase conversion unit 36, the PI control unit 38, the distribution unit 40, and the two-phase to three-phase conversion units 42 and 44 are included in the motor control unit 32.

The three-phase voltage commands Vu1, Vv1, and Vw1 for the first inverter 12 from the two-phase to three-phase conversion unit 42 are supplied to a first inverter control unit 46, and the three-phase voltage commands Vu2, Vv2, and Vw2 for the second inverter 14 are supplied to a second inverter control unit 48. The first inverter control unit 46 receives the rotor rotating angle θ and the first inverter input voltage VH1 and produces switching signals for turning on or off the switching elements of the first inverter 12 based on a comparison of a PWM carrier (triangular wave) with the voltage commands Vu1, Vv1, and Vw1. The first inverter control unit 46 then supplies the switching signals to the first inverter 12. Similarly, the second inverter control unit 48 produces switching signals for turning on or off the switching elements in the second inverter 14 and supplies the switching signals to the second inverter 14.

In this manner, the switching of the first inverter 12 and the second inverter 14 is controlled by the signals from the control unit 24. Accordingly, outputs from the first inverter 12 and the second inverter 14 are added up, causing a flow of a desired current to the motor 10.

"Switching Waveform"

Figure 3A:
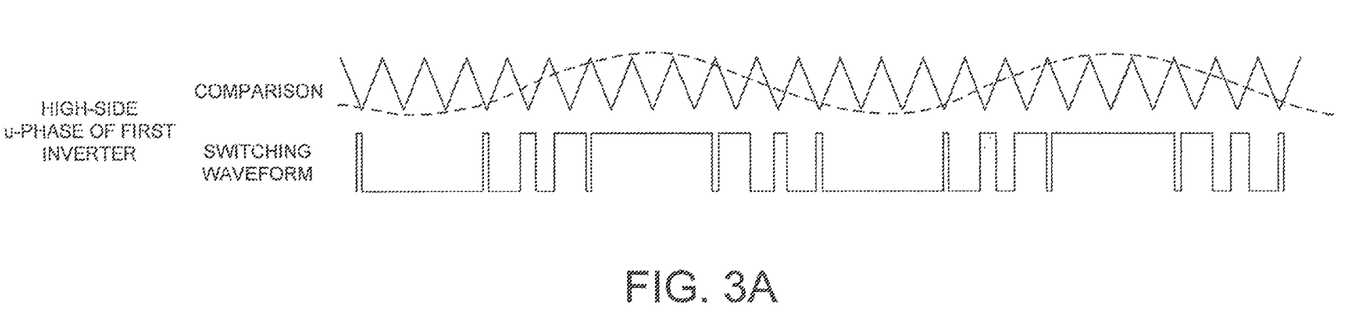
FIG. 3A is a diagram illustrating a switching waveform (at a 50:50 distribution ratio) of a high-side switching element of a first inverter.
Figure 3B:
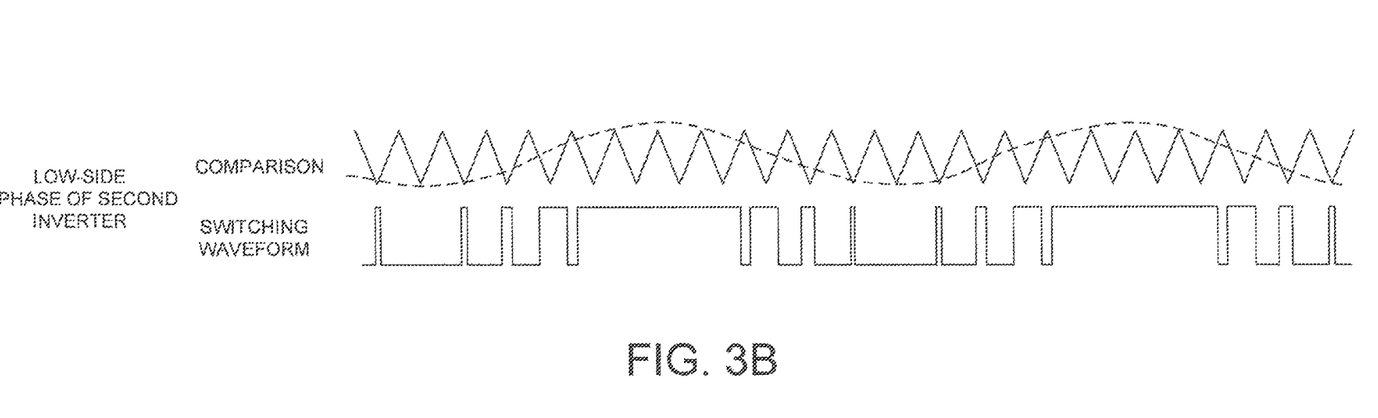
FIG. 3B is a diagram illustrating a switching waveform (at a 50:50 distribution ratio) of a low-side switching element of a second inverter.

FIGS. 3A and 3B illustrates production of the switching signals in the first inverter control unit 46 and the second inverter control unit 48. In the example illustrated in FIG. 3A, the upper part of the diagram illustrates a comparison of the triangular wave (solid line) and the voltage command Vu1 for a high-side u-phase switching element of the first inverter 12 (broken line), and the lower part of the diagram illustrates a switching waveform obtained by the comparison result. FIG. 3B relates to a low-side u-phase switching element of the second inverter 14, and a waveform illustrated in FIG. 3B is equal to that in FIG. 3A. Due to such a switching operation, a current flows from the high-side u-phase switching element of the first inverter 12 to the low-side u-phase switching element of the second inverter 14 through the u-phase coil 10u of the motor 10. Basically, the switching waveforms of a high-side u-phase switching element of the second inverter 14 and a low-side u-phase switching element of the first inverter 12 are different in phase by 180 degrees from those illustrated in FIGS. 3A and 3B and are different in phase by 180 degrees from the u-phase coil 10u, which causes a current in the opposite direction. The switching operations for the first inverter 12 and the second inverter 14 are controlled in such a manner that currents having phases different from each other by 120 degrees flow through the u-phase coil 10u, the v-phase coil 10v, and the w-phase coil 10w of the motor 10. In this example, there is a period in which a voltage command continuously exceeds the triangular wave, and this period causes overmodulation PWM control.

"Motor Voltage and Current"

Figure 4:
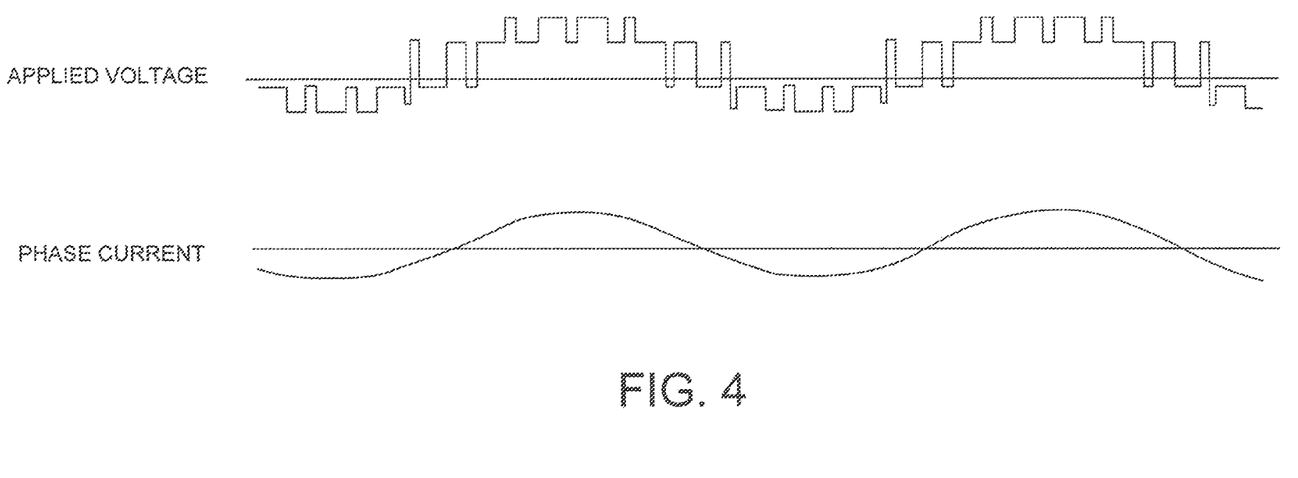
FIG. 4 is a diagram illustrating an applied voltage with respect to one phase of a motor and a waveform of a corresponding current.

The upper row of FIG. 4 illustrates an applied voltage with respect to one phase of the motor 10, and the lower row of the diagram illustrates a motor current (phase current). A voltage applied to each phase of the motor 10 is formed from an induced voltage (back electromotive voltage) generated by the motor 10, and output voltages of the first inverter 12 and the second inverter 14 (voltages output by turning on or off the switching elements). In other words, the switching elements of the first inverter 12 and the second inverter 14 are turned on or off by switching signals as illustrated in FIGS. 3A and 3B, and a voltage in one direction for a current flowing from the first inverter 12 to the second inverter 14 is applied to one phase of the motor 10. Simultaneously, a voltage in the other direction for a current flowing from the second inverter 14 to the first inverter 12 is applied to one phase of the motor 10 by signals having the opposite phase. Since a phase current depends on a voltage to be applied, application of a voltage as illustrated in the upper row of FIG. 4 causes a phase current as illustrated in the lower row of FIG. 4 to flow in one phase of the motor 10.

"Distribution of Outputs in Two Inverters"

The distribution unit 40 in FIG. 2 distributes the motor voltage vector V (vd and vq) to the first and the second inverter voltage vectors V (INV1) and V (INV2) based on, for example, various kinds of information (information for distribution) supplied from the vehicle control unit 30, which is a higher-order control unit, and based on inverter information that indicates operating states of the first inverter 12 and the second inverter 14. While a motor voltage vector is maintained, the motor voltage vector is distributed to two inverter voltage vectors. Accordingly, this distribution involves changes of the motor voltage vector in magnitude, phase, and positive/negative directions.

"Changes in Distribution Ratio of Output"

Figure 5:
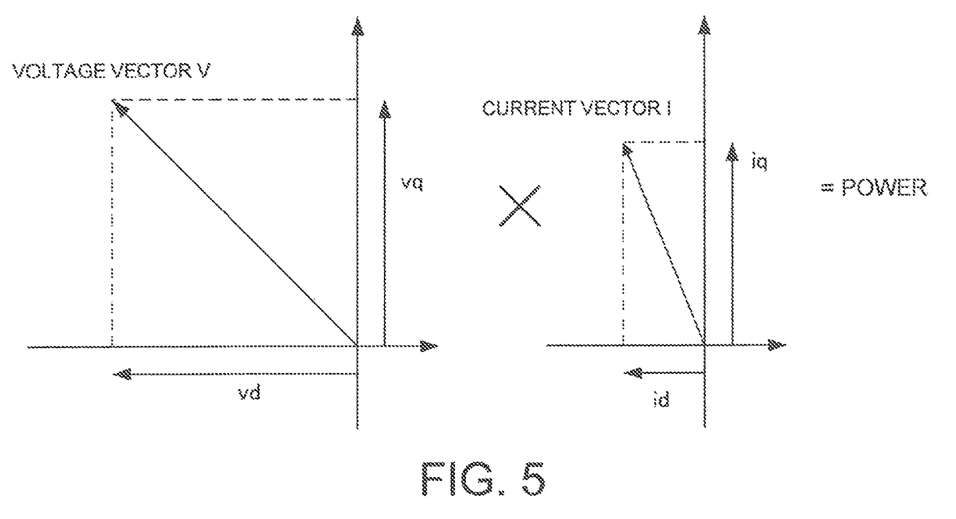
FIG. 5 is a diagram for describing a motor voltage vector in a case of using one inverter.

The distribution of the motor voltage vector V will be described with reference to FIGS. 5 to 8B. FIG. 5 is a diagram for describing the motor voltage vector V in a case of using one inverter, and FIGS. 6 to 8B are diagrams for describing an example of distribution of the motor voltage vector V in a case of using two inverter. In FIGS. 6 to 8B, the boldfaced solid line indicates the first inverter voltage vector V (INV1), and the boldfaced broken line indicates the second inverter voltage vector V (INV2). In FIGS. 5 to 8B, when the vectors overlap each other, those vectors are appropriately shifted to facilitate visualization.

FIG. 5 illustrates vector control of a voltage and a current at the time of normal motor drive with one inverter. The motor voltage vector V (d-axis voltage vd and q-axis voltage vq) and a motor current vector I (d-axis current id and q-axis current iq) are determined according to an output request for the motor 10. The motor voltage×the motor current produces an output (power).

Figure 6:
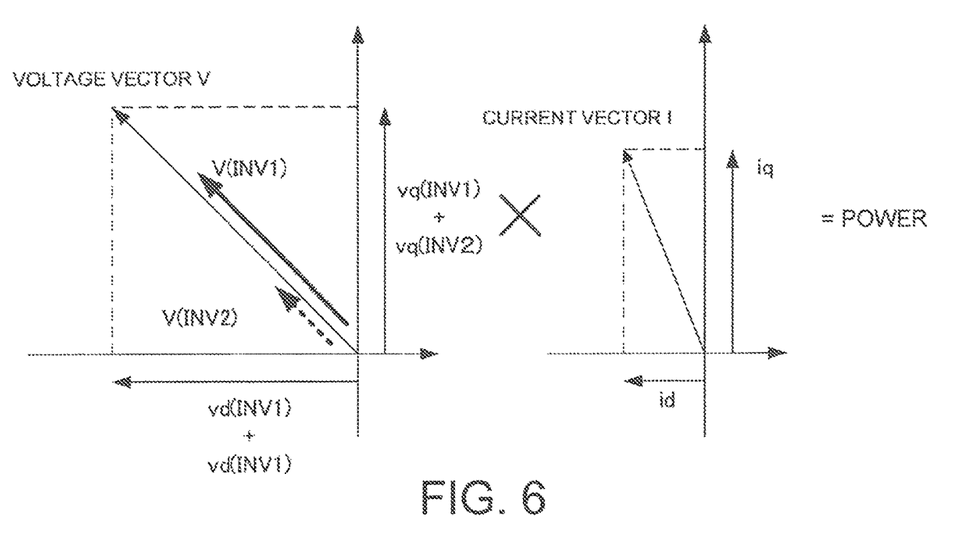
FIG. 6 is a diagram illustrating an example of distribution of a motor voltage vector in a case of using two inverters.

The system in this example includes two inverters, the first inverter 12 and the second inverter 14. Herein, outputs from the two inverters may be made unequal. In FIG. 6, the voltage vector V (INV1) of an output from the first inverter 12 (first inverter voltage vector) and the voltage vector V (INV2) of an output from the second inverter 14 (second inverter voltage vector) are changed in magnitude but not in phase. This case does not vary the output (power) from the motor 10 but varies the shape (waveform) of the switching signals in the first inverter 12 and the second inverter 14. Provided that d-axis components of the outputs from the first inverter 12 and the second inverter 14 are vd (INV 1) and vd (INV 2), the d-axis components vd=vd (INV 1)+vd (INV 2), and the q-axis components vq=vq (INV1)+vq (INV2).

Changing a distribution ratio while maintaining the phases of the voltage vectors V (INV1) and V (INV2), or two inverter outputs, as illustrated in FIG. 6 varies the waveform of the switching signals. This leads to variations in shape of a phase voltage with respect to the motor 10, causing an increase or a decrease in number of switching operations and variations in pulse width.

Furthermore, the outputs and losses in the first inverter 12 and the second inverter 14 vary, and heat generated in the first inverter 12 and the second inverter 14 also vary. Moreover, the variations in shape of the phase voltage leads to variations in shape of the phase current, causing variations in sound to be generated as well as in battery current.

In this manner, as the motor voltage vector V is distributed to the voltage vector V (INV1) of the first inverter 12 and the voltage vector V (INV2) of the second inverter 14 at any ratio, it is possible to meet requirements for the system.

Figure 7A:
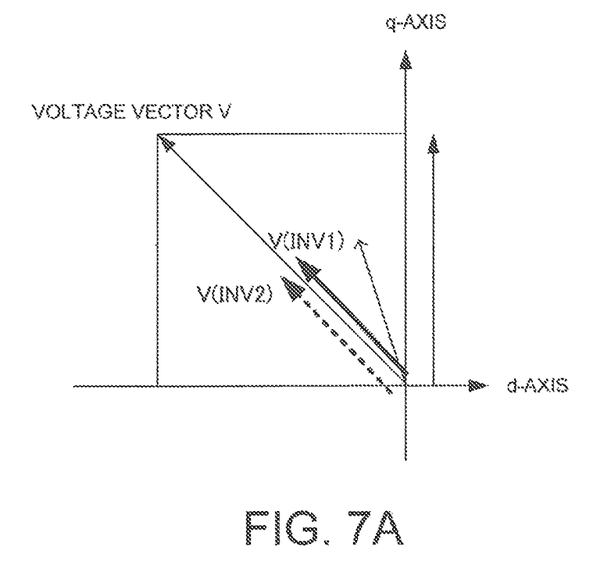
FIG. 7A is a diagram illustrating another example of distribution of the motor voltage vector in a case of using two inverters.

Herein, an aspect of distribution of the motor voltage vector V may be changed appropriately as necessary. For example, in powering mode (state of energy consumption), the magnitude of the voltage vector V (INV1) of the first inverter 12 and the magnitude of the voltage vector V (INV2) of the second inverter 14 may be changed, while the phases thereof being maintained. In this case, as illustrated in FIG. 7A, the magnitude of the voltage vector V (INV1) of the first inverter 12 and the magnitude of the voltage vector V (INV2) of the second inverter 14 may be made equal and may be distributed equally. In this embodiment, loads on the first inverter 12 and the second inverter 14 are substantially equal. Therefore, this embodiment is suitable when states (such as SOCs and temperatures) of the two batteries 18 and 22 and the two inverters 12 and 14 are substantially equivalent.

Furthermore, one voltage vector V may be made larger than the other voltage vector V. For example, as illustrated in FIG. 6, the voltage vector V (INV1) of the first inverter 12 may be increased and the voltage vector V (INV2) of the second inverter 14 may be decreased. According to the example illustrated in FIG. 6, a load on the first inverter 12 is large, and a load on the second inverter 14 is small. Therefore, this embodiment is suitable when there is a difference in state (such as SOCs and temperatures) between the two batteries 18 and 22 and the inverters 12 and 14, and when this difference should be eliminated.

Figure 7B:
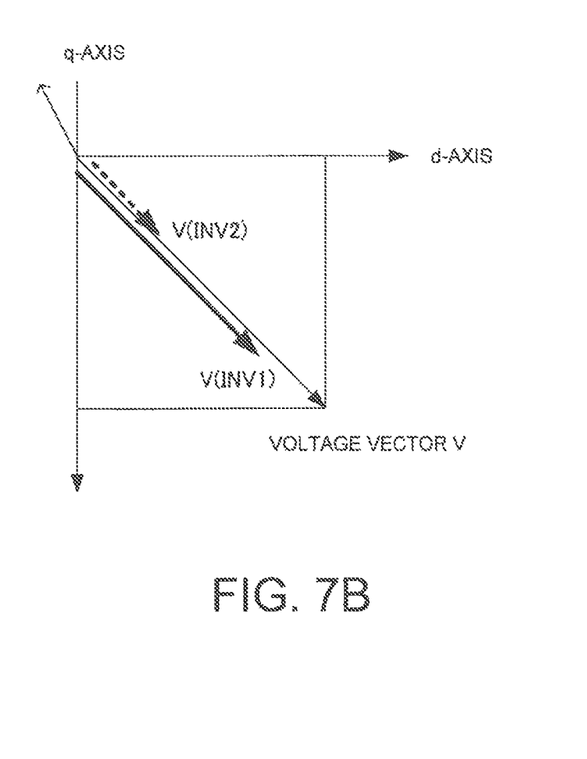
FIG. 7B is a diagram illustrating another example of distribution of the motor voltage vector in a case of using two inverters.

In addition, not only in powering mode but also in regeneration mode (state of energy recovery), the motor voltage vector V is distributed in a similar manner. FIG. 7B illustrates a case where, in regeneration mode (state of energy recovery), the voltage vector V (INV1) of the first inverter 12 and the voltage vector V (INV2) of the second inverter 14 are changed in magnitude but maintained in phase.

Figure 8A:
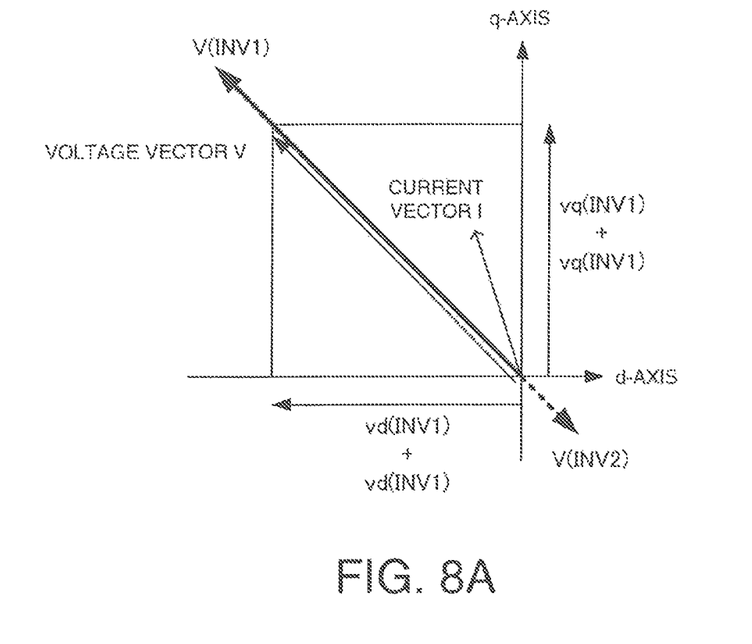
FIG. 8A is a diagram illustrating another example of distribution of the motor voltage vector in a case of using two inverters.

It is also possible to change a positive or a negative direction of either the voltage vector V (INV1) of the first inverter 12 or the voltage vector V (INV2) of the second inverter 14 without changing the motor voltage vector V. For example, as illustrated in FIG. 8A, the voltage vector V (INV1) of the first inverter 12 may be increased with respect to the motor voltage vector V by a predetermined amount, and the voltage vector V (INV2) of the second inverter 14 may be oriented to the regeneration side in equal amount. Accordingly, one of two inverters is in a state of energy consumption, while the other is in a state of energy flow. Such an embodiment enables charging of the other battery with power of one battery without changing the motor voltage vector V (in powering mode).

Figure 8B:
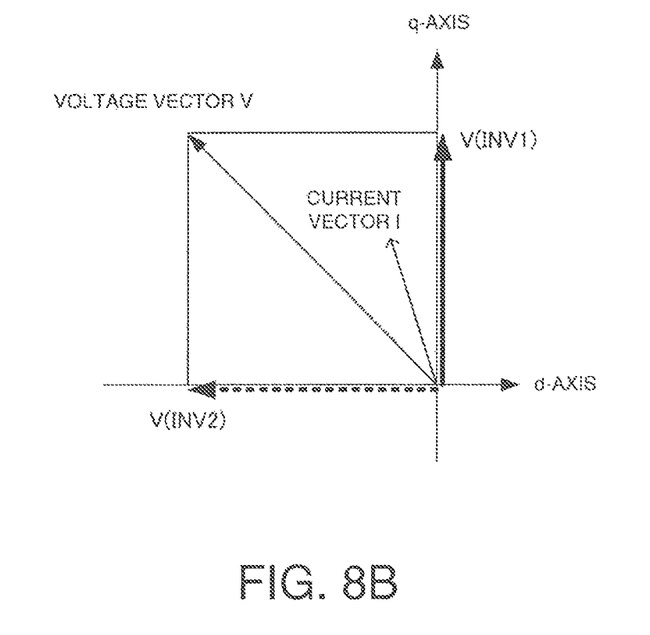
FIG. 8B is a diagram illustrating another example of distribution of the motor voltage vector in a case of using two inverters.

The voltage vector V (INV1) of the first inverter 12 and the voltage vector V (INV2) of the second inverter 14 may be different from each other in phase. For example, as illustrated in FIG. 8B, the voltage vector V (INV1) of the first inverter 12 may be a q-axis voltage, and the voltage vector V (INV2) of the second inverter 14 may be a d-axis voltage. In addition to this example, as long as added vectors of the first inverter voltage vector V (INV1) and the second inverter voltage vector V (INV2) match the motor voltage vector V, the phases of the voltage vectors of the both inverters may be changed freely. Changing voltage vectors of two inverters in phase changes a power factor in outputs from the two inverters.

"External Charging"

The first battery 18 and the second battery 22 are chargeable with external power supplied through the charger 25. When an instruction on external charge of the first battery 18 is given from a higher-order control device (not illustrated), the motor control unit 32 shuts down (all arms off) both of the first inverter 12 and the second inverter 14, and then turns on a relay 26 interposed between the charger 25 and the first battery 18. Accordingly, external power is transmitted to the first battery 18 through the charger 25, and the first battery 18 is externally charged.

On the other hand, when an instruction on external charge of the second battery 22 is given from a higher-order control device, the motor control unit 32 controls the first inverter 12 and the second inverter 14, and outputs the external power or power of the first battery 18 charged with the external power from the first inverter 12, while maintaining the motor 10 in a stationary state. Furthermore, the motor control unit 32 transmits the power to the second battery 22 through the motor 10 and the second inverter 14. In other words, power is transmitted to the second battery 22 through the first inverter 12, the coil of the motor 10, and the second inverter 14.

By transmitting power to the second battery 22 through the inverters 12 and 14 and the motor 10 in this manner, the two batteries 18 and 22 are charged by one charger 25. Accordingly, it is possible to reduce the number of the chargers 25 and the charging inlets connected to the chargers 25, which leads to cost reduction. Each of the batteries 18 and 22 may be provided with the charging inlet and the charger 25. However, on each switching of the batteries 18 and 22 which are to be externally charged, this case requires reinsertion of the charging plug inserted in one charging inlet to the other charging inlet. Such reinsertion of the charging plug is troublesome, causing a problem that charging may fail to be completed during the night, which is not convenient for users. On the other hand, as in this example, when two batteries 18 and 22 are charged by one charger 25, it is not necessary to reinsert the charging plug, which enhances user-friendliness.

Herein, examples of modes for external charging the second battery 22 include shutdown mode and regeneration mode. In the former mode, the second inverter 14 is shut down, and in the latter mode, the second inverter 14 is driven regeneratively. First, shutdown mode will be described.

"External Charging in Shutdown Mode"

In a case where the second battery 22 is externally charged in shutdown mode, the second inverter 14 is brought into a shutdown state where all the arms are turned off. In addition, the first inverter 12 is driven in powering mode so as to set the q-axis current iq of the motor 10 to 0 and the d-axis current id to a constant value (any value but 0).

When the q-axis current iq as the torque current becomes 0, the output torque of the motor 10 also becomes 0, which maintains the motor 10 stationary. Furthermore, a current from the first inverter 12 flows through the coils $10u$, $10v$, and $10w$ of the motor 10 and then flows to the second battery 22 through the rectifying element (for example, a backward diode) of the second inverter 14. Accordingly, power from the first battery 18 or the charger 25 is transmitted to the second battery 22, and the second battery 22 is charged. Note that the power supply side (the first battery 18 or the charger 25) should have a potential higher than the power receiving side (the second battery 22), otherwise external charging in shutdown mode is not performed.

Next, with reference to FIG. 2, a flow of external charging control in shutdown mode will be described more specifically. When the vehicle control unit 30 gives an instruction for externally charging of the second battery 22, the current command generation unit 34 outputs the d-axis current idcom=Ia and the q-axis current iqcom=0 as the current commands of the motor 10 (note that Ia≠0). Note that the value Ia of the d-axis current idcom is set according to states of the second battery 22 (for example, an allowable maximum input power and SOC), and states of the external power (such as a maximum output power of the external power supply).

When the current command generation unit 34 outputs the current commands, the PI control unit 38 calculates the motor vector voltage V (vd and vq) in a manner similar to normal control. The distribution unit 40 distributes the motor voltage vector V to the first inverter 12 and the second inverter 14. When the second battery 22 is externally charged, the second inverter 14 shuts down, and 100% of the motor voltage vector V is distributed to the first inverter 12 and 0% to the second inverter 14. The distribution unit 40 outputs the first inverter voltage vector V (INV1), according to the distribution results, to the two-phase to three-phase conversion unit 42. Furthermore, the distribution unit 40 outputs a shutdown command for the second inverter 14 to the two-phase to three-phase conversion unit 44.

The two-phase to three-phase conversion unit 42 outputs the voltage commands Vu1, Vv1, and Vw1 corresponding to the first inverter voltage vector V (INV1), and the first inverter control unit 46 generates a switching signal corresponding to the voltage command and drives the first inverter 12. The shutdown command output from the distribution unit 40 is transmitted to the second inverter control unit 48 through the two-phase to three-phase conversion unit 44. According to this shutdown command, the second inverter control unit 48 turns off all the arms of the second inverter 14 and shuts down the second inverter 14. As a result of such control, power is transmitted to the second battery 22.

Figure 9:
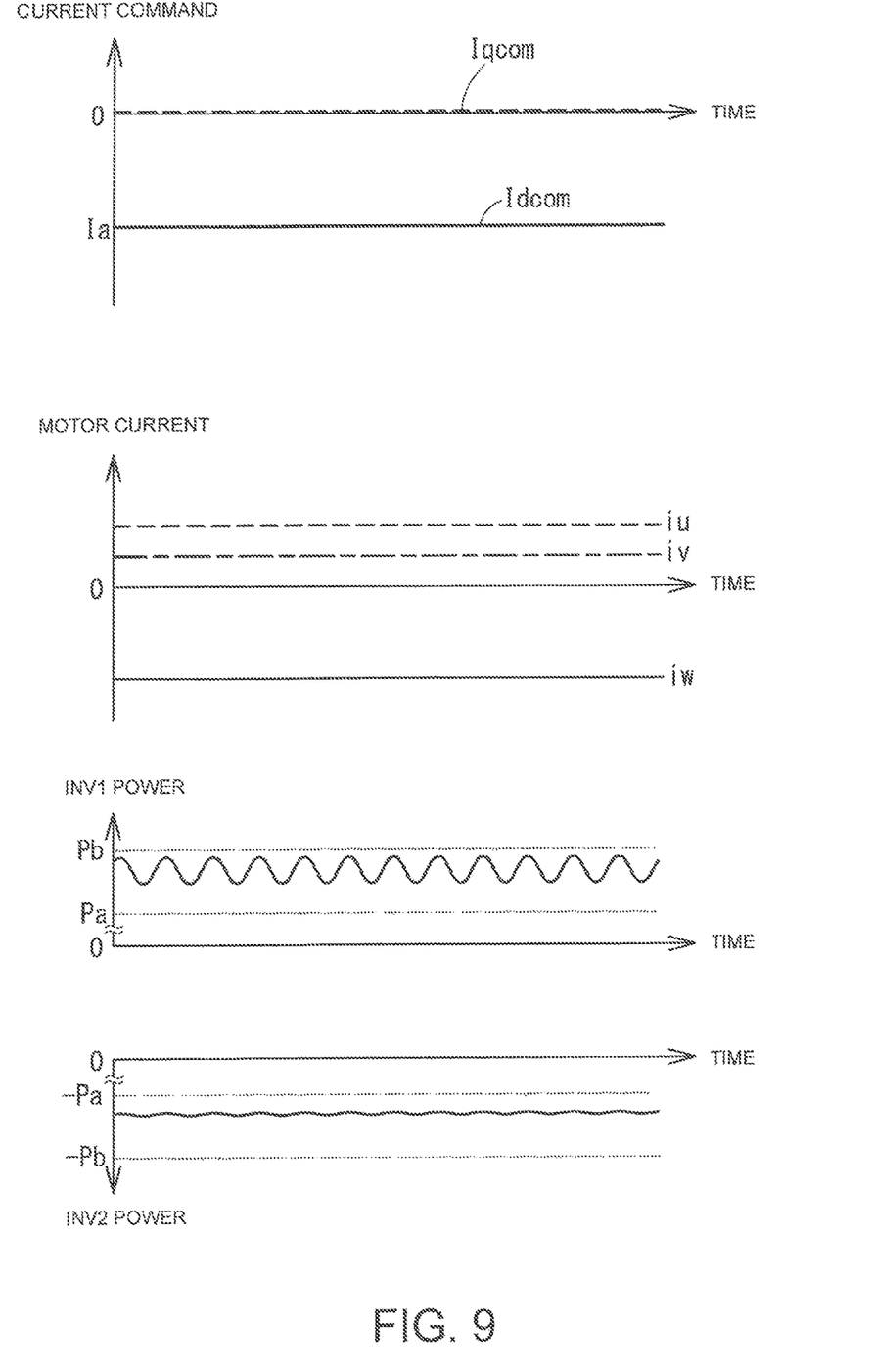
FIG. 9 is a diagram illustrating current commands (two-phase representation), a motor current (three-phase representation), and inverter power when a second power supply is externally charged in shutdown mode.

FIG. 9 is a diagram illustrating examples of current commands (two-phase representation), a motor current (three-phase representation), and inverter power when the second battery 22 is externally charged in shutdown mode. In the example of FIG. 9, the current commands are as follows: q-axis current iqcom=0 and d-axis current idcom=Ia. Accordingly, the torque generated by the motor 10 becomes 0, and the rotative speed of the motor 10 also becomes 0. Since the rotative speed is 0, each of the phase currents iu, iv, and iw of the motor 10 becomes a locked current (direct current).

The first inverter 12 is driven to satisfy iqcom=0 and idcom=Ia, causing powering mode (state of energy consumption) where the output power takes a positive value. On the other hand, since the current flows in the second inverter 14 through the rectifying element, the second battery 22 is operated in regeneration mode (state of energy recovery) where the output power takes a negative value, and the second battery 22 is charged.

"External Charging in Regeneration Mode"

When the second battery 22 is externally charged in regeneration mode, the first inverter 12 is driven in powering mode and the second inverter 14 is driven regeneratively so that the q-axis current iq of the motor 10 becomes 0 and the d-axis current id becomes a constant value (any value but 0). More specifically, when iq=0 and id=Ia (Ia≠0), the motor voltage vector V is vq=0 and vd=Va (Va≠0). The distribution unit 40 distributes the motor voltage vector V so as to make a synthesized vector of the first inverter voltage vector V (INV1) and the second inverter voltage vector V (INV2) equal to the motor voltage vector V, and to make the power of the first inverter 12 positive (powering mode) and the power of the second inverter 14 negative (regeneration mode).

Figure 10:
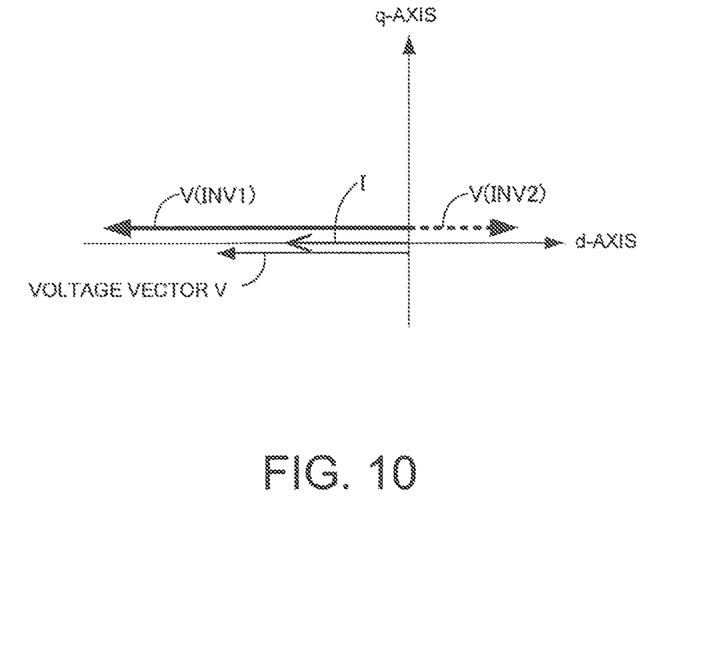
FIG. 10 is a diagram illustrating an example of distribution of the motor voltage vector when the second power supply is externally charged in regeneration mode.

FIG. 10 is a diagram illustrating an example of distribution of the motor voltage vector V when the second battery 22 is externally charged in regeneration mode. In FIG. 10, when the vectors overlap each other, those vectors are appropriately shifted to facilitate visualization. As described above, in external charging in regeneration mode, the q-axis component (q-axis current) of the motor current vector I is 0, and the d-axis component (d-axis current) is a constant value. In regard to the motor voltage vector V, the q-axis component (q-axis voltage) is 0, and the d-axis component (d-axis voltage) is a constant value.

As illustrated in FIG. 10, the first inverter voltage vector V (INV1) is equal to the motor voltage vector V in phase and is larger than the motor voltage vector V in magnitude. The phase of the second inverter voltage vector V (INV2) is 180 degrees inverted from that of the first inverter voltage vector V (INV1). In addition, the magnitude of the second inverter voltage vector V (INV2) is a value obtained by subtracting the magnitude of the motor voltage vector V from the magnitude of the first inverter voltage vector V (INV1). Accordingly, the first inverter 12 is in powering mode and the second inverter 14 is in regeneration mode. Note that external charging in regeneration mode may be performed even though the power supply side (the first battery 18 or the charger 25) has a potential lower than the power receiving side (the second battery 22).

Next, with reference to FIG. 2, the flow of external charging control of the second battery 22 in regeneration mode will be described more specifically. When the vehicle control unit 30 gives an instruction for externally charging of the second battery 22, the current command generation unit 34 outputs the d-axis current idcom=Ia and the q-axis current iqcom=0 as the current commands of the motor 10 (note that Ia≠0).

When the current command generation unit 34 outputs the current commands, the PI control unit 38 calculates the motor vector voltage V (vd and vq) in a manner similar to normal control. The distribution unit 40 distributes the motor voltage vector V to the first inverter 12 and the second inverter 14. More specifically, the motor voltage vector V is distributed to put the first inverter 12 in powering mode and the second inverter 14 in regeneration mode. The distribution unit 40 outputs the first inverter voltage vector V (INV1), according to the distribution results, to the two-phase to three-phase conversion unit 42 and the second inverter voltage vector V (INV2) to the two-phase to three-phase conversion unit 44.

The two-phase to three-phase conversion units 42 and 44 output voltage commands corresponding to the inverter voltage vectors V (INV1) and V (INV2) to the inverter control units 46 and 48, respectively. The inverter control units 46 and 48 produce switching signals corresponding to the voltage commands and drive the corresponding inverters 12 and 14, respectively.

Figure 11:
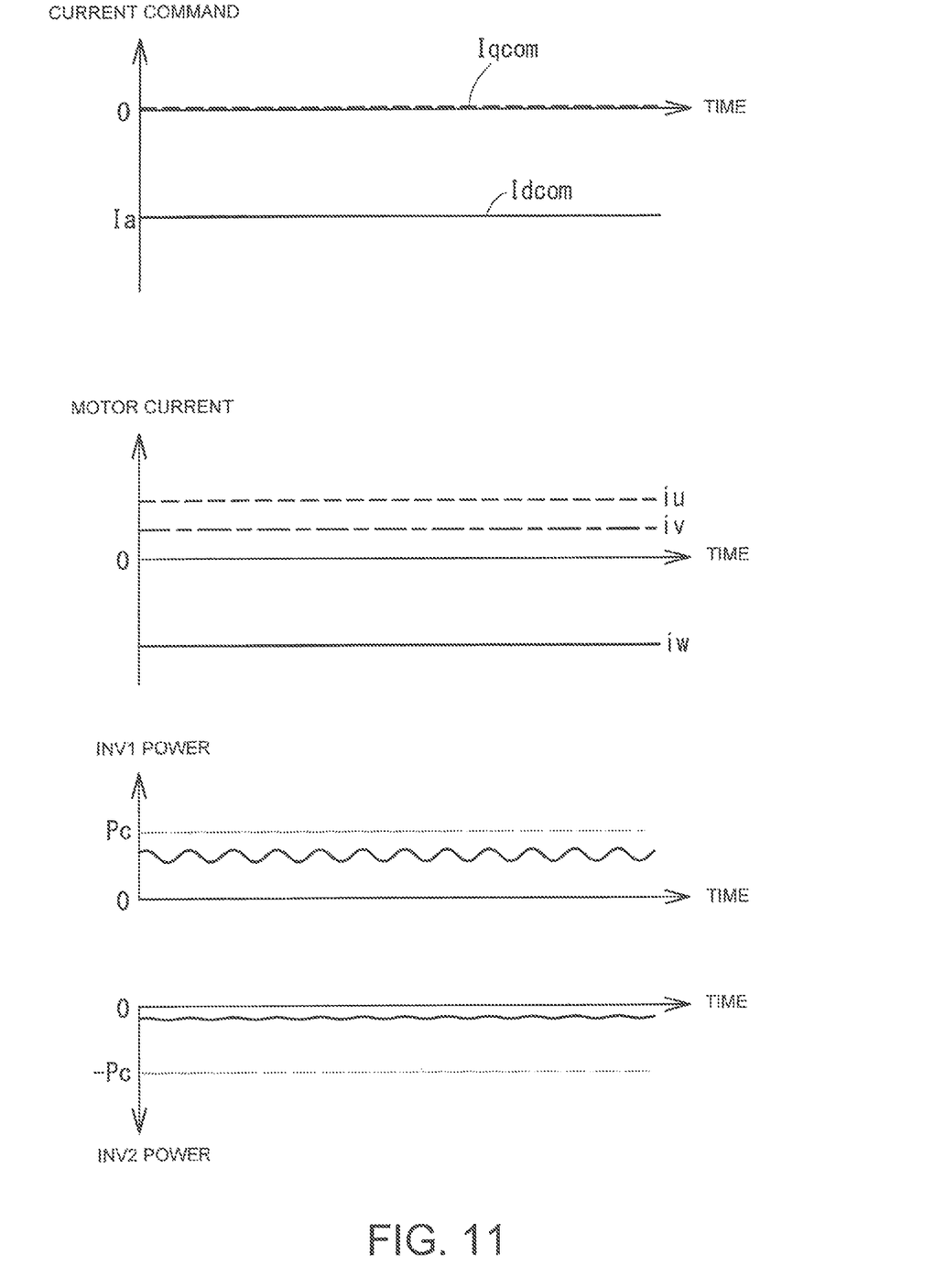
FIG. 11 is a diagram illustrating current commands (two-phase representation), a motor current (three-phase representation), and inverter power when the second power supply is externally charged in regeneration mode.

FIG. 11 is a diagram illustrating an example of current commands (two-phase representation), a motor current (three-phase representation), and inverter power when the second battery 22 is externally charged in regeneration mode. In the example of FIG. 11, the current commands are as follows: the q-axis current iqcom=0 and the d-axis current idcom=Ia. Accordingly, the torque generated by the motor 10 becomes 0, and the rotative speed of the motor 10 also becomes 0. Since the rotative speed is 0, each of the phase currents iu, iv, and iw of the motor 10 becomes a locked current (direct current).

As illustrated in the third row of FIG. 11, the first inverter 12 is driven in powering mode (state of energy consumption) where the power takes a positive value. As illustrated in the last row of FIG. 11, the second inverter 14 is driven in regeneration mode (state of energy recovery) where the power takes a negative value. Then, the second battery 22 is charged.

In the above description, the motor voltage vector V is calculated by performing the PI calculation based on, for example, the current commands idcom and iqcom, and furthermore, the motor voltage vector V is distributed to calculate the first inverter voltage vector V (INV1) and, the second inverter voltage vector V (INV2). However, the first inverter voltage vector V (INV1) and the second inverter voltage vector V (INV2) may be generated directly without such PI calculation. For example, a map in which a correlation between power (charging power) to be supplied to the second battery 22 at the time of external charging and the first and the second inverter voltage vectors V (INV1) and V (INV2) is recorded may be stored. When an instruction on charging of the second battery 22 is given, the first and the second inverter voltage vectors V (INV1) and V (INV2) may be specified directly with reference to the map.

Whether to charge in shutdown mode or in regeneration mode may be switched appropriately depending on the situation. However, shutdown mode facilitates control and reduces the switching loss. Accordingly, when the power transmission side (the first battery 18 or the charger 25) has a potential higher than the power receiving side (the second battery 22), in principle, charging may be performed in shutdown mode. In any case, according to the motor system of this example, two batteries 18 and 22 are charged by one charger 25. This arrangement does not require a plurality of chargers 25 and charging inlets, which leads to cost reduction. Furthermore, this arrangement does not require reinsertion of a charging plug in the middle of charging, which leads to enhancement of user-friendliness.

"Other Arrangement"

The arrangements described above are examples. As long as power from the first inverter 12 is transmitted to the second battery 22 through the second inverter 14 while the motor 10 is in a stationary state, other arrangements may be changed as appropriate. For example, in this example, the q-axis current iq is set to 0 in order to make the motor 10 stationary. However, as long as the q-axis current iq is less than stationary torque of the motor 10, the q-axis current iq may be larger than 0. Furthermore, instead of controlling the q-axis current iq, the motor 10 may be stopped by a mechanical brake.

In FIG. 2, the motor control unit 32 is arranged differently from the vehicle control unit 30 which is a higher-order control unit. However, the vehicle control unit 30 may execute the functions of the motor control unit 32. Furthermore, the motor control unit 32 may include a lower-order microcomputer. Moreover, all or part of the motor control unit 32 may include hardware.

The motor control unit 32 may include a plurality of CPUs. The functions may be divided so that each CPU executes each of the functions. In a case where the motor control unit 32 includes the plurality of CPUs, each CPU may be configured to execute the entire processing.

Two inverters may be controlled by a system with two power supplies and two inverters based on a total voltage. Alternatively, two inverters may be controlled by two CPUs based on a total voltage in a system provided with two power supplies. With such an arrangement, even when one CPU fails, it is possible to drive a motor by the other CPU.

The invention claimed is:

1. A motor system, comprising:
a motor;
a first power supply;
a second power supply;
a first inverter which converts direct current power of the first power supply into alternating current power and outputs the alternating current power to the motor;
a second inverter which converts direct current power of the second power supply into alternating current power and outputs the alternating current power to the motor;

a charger which is connected to the first power supply and supplies external power; and a control unit which controls drive of the first inverter and the second inverter to drive the motor, wherein, when the second power supply is charged with the external power, the control unit drives the first inverter and the second inverter to allow power from the first inverter to be transmitted to the second power supply through the motor and the second inverter while the motor is in a stationary state.

2. The motor system according to claim 1, wherein, when the second power supply is charged, the control unit calculates voltage vectors of the first inverter and the second inverter to set a q-axis current of the motor to 0.

3. The motor system according to claim 1, wherein the second inverter includes a plurality of legs which are connected in parallel and are formed by connecting an upper arm and a lower arm in series, wherein each of the legs has both ends connected to the second power supply and an intermediate point being connected to a coil of the motor, the upper arm and the lower arm both include a switching element and a rectifying element, the rectifying element being connected in parallel with the switching element and configured to flow a current in a reverse direction, and when the second power supply is charged, the control unit drives the first inverter in powering mode and shuts down the second inverter to allow power from the first inverter to be transmitted to the second power supply through the rectifying element.

4. The motor system according to claim 1, wherein, when the second power supply is charged, the control unit drives the first inverter in powering mode and drives the second inverter in regeneration mode to allow power from the first inverter to be transmitted to the second power supply.

* * * * *

UNITED STATES PATENT AND TRADEMARK OFFICE
CERTIFICATE OF CORRECTION

PATENT NO. : 10,951,041 B2
APPLICATION NO. : 16/360552
DATED : March 16, 2021
INVENTOR(S) : Kiyotaka Matsubara et al.

It is certified that error appears in the above-identified patent and that said Letters Patent is hereby corrected as shown below:

In the Specification

In Column 3, Line(s) 51, after "motive", delete ",".

In Column 12, Line(s) 1, after "and", delete ",".

Signed and Sealed this
Twentieth Day of April, 2021

Drew Hirshfeld
*Performing the Functions and Duties of the
Under Secretary of Commerce for Intellectual Property and
Director of the United States Patent and Trademark Office*